United States Patent
Goodman

(10) Patent No.: US 7,873,787 B2
(45) Date of Patent: Jan. 18, 2011

(54) CACHING CONTROLS/POLICIES FOR STRUCTURED MARKUP OBJECTS

(75) Inventor: Brian D. Goodman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 11/043,738

(22) Filed: Jan. 26, 2005

(65) Prior Publication Data

US 2006/0168534 A1    Jul. 27, 2006

(51) Int. Cl.
*G06F 12/00* (2006.01)
*G06F 13/00* (2006.01)

(52) U.S. Cl. .................. 711/133; 711/100; 711/154
(58) Field of Classification Search .............. 711/133, 711/100, 154
See application file for complete search history.

(56) References Cited

U.S. PATENT DOCUMENTS

| | | | |
|---|---|---|---|
| 6,202,072 B1 * | 3/2001 | Kuwahara | 715/513 |
| 6,499,038 B2 * | 12/2002 | Kitayama | 707/103 R |
| 7,146,563 B2 * | 12/2006 | Hesmer et al. | 715/223 |
| 7,275,131 B2 * | 9/2007 | Goodman | 711/106 |
| 2002/0133566 A1 | 9/2002 | Teeple | |
| 2002/0184340 A1 | 12/2002 | Srivastava et al. | |
| 2003/0061278 A1 | 3/2003 | Agarwalla et al. | |
| 2003/0236857 A1 | 12/2003 | Takase et al. | |
| 2004/0015504 A1 | 1/2004 | Ahad et al. | |
| 2005/0120180 A1 * | 6/2005 | Schornbach et al. | 711/133 |
| 2006/0031539 A1 * | 2/2006 | Ferris et al. | 709/228 |
| 2006/0069746 A1 * | 3/2006 | Davis et al. | 709/218 |
| 2006/0107090 A1 * | 5/2006 | Emma et al. | 714/5 |
| 2007/0050340 A1 * | 3/2007 | von Kaenel et al. | 707/3 |

* cited by examiner

*Primary Examiner*—Tuan V. Thai

(57) ABSTRACT

We provide exemplary systems and methods using structured markup to define objects with cache controls. Examples of structure markup include Extensible Markup Language ("XML") and Standard Generalized Markup Language ("SGML"). A cache control structure (i.e., the XML-schema) can be added to a variety of levels or layers of granularity in the object. XML data binding, which is the process of converting XML-schema to native object code, may provide an application access to the cache controls of an object. The XML-schema may be accessed using a Uniform Resource Locator ("URL"), for example, for convenient remote access.

15 Claims, 5 Drawing Sheets

```xml
<?xml version="1.0" encoding="UTF-8"?>
<xsd:schema targetNamespace="http://w3.ibm.com/schemas/services/2003/07/28/stockquote"
xmlns:xsd="http://www.w3.org/2001/XMLSchema"
xmlns="http://w3.ibm.com/schemas/services/2003/07/28/stockquote/wsd1"
xmlns:tns="http://w3.ibm.com/schemas/services/2003/07/28/stockquote"
elementFormDefault="qualified" version="1.0">
    <xsd:element name="volume" type="xsd:integer" />
    <xsd:element name="dollar" type="xsd:float" />
    <xsd:element name="percent" type="xsd:float" />
    <xsd:element name="positive" type="xsd:boolean" />
    <xsd:element name="timeBetweenRefresh" type="xsd:long" />
    <xsd:element name="lastRefresh" type="xsd:long" />
    <xsd:element name="nextRefresh" type="xsd:long" />
    <xsd:element name="cacheControls">
        <xsd:complexType>
            <xsd:all>
                <xsd:element ref="tns:timeBetweenRefresh" />
                <xsd:element ref="tns:lastRefresh" />
                <xsd:element ref="tns:nextRefresh" />
            </xsd:all>
        </xsd:complexType>
    </xsd:element>
    <xsd:element name="change">
        <xsd:complexType>
            <xsd:all>
                <xsd:element ref="tns:percent" />
                <xsd:element ref="tns:dollar" />
                <xsd:element ref="tns:positive" />
            </xsd:all>
        </xsd:complexType>
    </xsd:element>
    <xsd:element name="price" type="xsd:float" />
    <xsd:element name="date" type="xsd:long" />
    <xsd:element name="lastTrade">
        <xsd:complexType>
            <xsd:all>
                <xsd:element ref="tns:date" />
                <xsd:element ref="tns:price" />
            </xsd:all>
        </xsd:complexType>
    </xsd:element>
    </xsd:element name="symbol" type="xsd:string" />
    </xsd:element name="quote">
        <xsd:complexType>
            <xsd:all>
                <xsd:element ref="tns:cacheControls" />
                <xsd:element ref="tns:symbol" />
                <xsd:element ref="tns:lastTrade" />
                <xsd:element ref="tns:change" />
                <xsd:element ref="tns:volume" />
            </xsd:all>
        </xsd:complexType>
    </xsd:element>
    </xsd:element name="quotes">
        <xsd:complexType>
            </xsd:sequence>
                <xsd:element ref="tns:quote" minOccurs="0" maxOccurs="unbounded"/>
            </xsd:sequence>
        <xsd:complexType>
    </xsd:element>

</xsd:schema>
```

FIG. 1

```xml
<?xml version="1.0" encoding="UTF-8"?>
<xsd:schema targetNamespace="http://w3.ibm.com/schemas/services/2003/07/28/stockquote"
  xmlns:xsd="http://www.w3.org/2001/XMLSchema"
  xmlns="http://w3.ibm.com/schemas/services/2003/07/28/stockquote/wsd1"
  xmlns:tns="http://w3.ibm.com/schemas/services/2003/07/28/stockquote"
  elementFormDefault="qualified" version="1.0">
    <xsd:element name="volume" type="xsd:integer" />
    <xsd:element name="dollar" type="xsd:float" />
    <xsd:element name="percent" type="xsd:float" />
    <xsd:element name="positive" type="xsd:boolean" />
    <xsd:element name="timeBetweenRefresh" type="xsd:long" default="60"/>
    <xsd:element name="lastRefresh" type="xsd:long" />
    <xsd:element name="nextRefresh" type="xsd:long" />
    <xsd:element name="cacheControls">
        <xsd:complexType>
            <xsd:all>
                <xsd:element ref="tns:timeBetweenRefresh" />
                <xsd:element ref="tns:lastRefresh" />
                <xsd:element ref="tns:nextRefresh" />
            </xsd:all>
        </xsd:complexType>
    </xsd:element>
    <xsd:element name="change">
        <xsd:complexType>
            <xsd:all>
                <xsd:element ref="tns:percent" />
                <xsd:element ref="tns:dollar" />
                <xsd:element ref="tns:positive" />
            </xsd:all>
        </xsd:complexType>
    </xsd:element>
    <xsd:element name="price" type="xsd:float" />
    <xsd:element name="date" type="xsd:long" />
    <xsd:element name="lastTrade">
        <xsd:complexType>
            <xsd:all>
                <xsd:element ref="tns:date" />
                <xsd:element ref="tns:price" />
            </xsd:all>
        </xsd:complexType>
    </xsd:element>
    <xsd:element name="symbol" type="xsd:string" />
    <xsd:element name="quote">
        <xsd:complexType>
            <xsd:all>
                <xsd:element ref="tns:cacheControls" />
                <xsd:element ref="tns:symbol" />
                <xsd:element ref="tns:lastTrade" />
                <xsd:element ref="tns:change" />
                <xsd:element ref="tns:volume" />
            </xsd:all>
        </xsd:complexType>
    </xsd:element>
    <xsd:element name="quotes">
        <xsd:complexType>
            <xsd:sequence>
                <xsd:element ref="tns:quote" minOccurs="0" maxOccurs="unbounded"/>
            </xsd:sequence>
        <xsd:complexType>
    </xsd:element>
</xsd:schema>
```

FIG. 3

```xml
<?xml version="1.0" encoding="UTF-8"?>
<xsd:schema targetNamespace="http://w3.ibm.com/schemas/services/2003/07/28/stockquote"
xmlns:xsd="http://www.w3.org/2001/XMLSchema"
xmlns="http://w3.ibm.com/schemas/services/2003/07/28/stockquote/wsd1"
xmlns:tns="http://w3.ibm.com/schemas/services/2003/07/28/stockquote"
elementFormDefault="qualified" version="1.0">
    <xsd:element name="volume" type="xsd:integer" />
    <xsd:element name="dollar" type="xsd:float" />
    <xsd:element name="percent" type="xsd:float" />
    <xsd:element name="positive" type="xsd:boolean" />
    <xsd:element name="timeBetweenRefresh" type="xsd:long" />
    <xsd:element name="lastRefresh" type="xsd:long" />
    <xsd:element name="nextRefresh" type="xsd:long" />
    <xsd:element name="cacheControls">
        <xsd:complexType>
            <xsd:all>
                <xsd:element ref="tns:timeBetweenRefresh" />
                <xsd:element ref="tns:lastRefresh" />
                <xsd:element ref="tns:nextRefresh" />
            </xsd:all>
        </xsd:complexType>
    </xsd:element>
    <xsd:element name="change">
        <xsd:complexType>
            <xsd:all>
                <xsd:element ref="tns:percent" />
                <xsd:element ref="tns:dollar" />
                <xsd:element ref="tns:positive" />
            </xsd:all>
        </xsd:complexType>
    </xsd:element>
    <xsd:element name="price" type="xsd:float" />
    <xsd:element name="date" type="xsd:long" />
    <xsd:element name="lastTrade">
        <xsd:complexType>
            <xsd:all>
                <xsd:element ref="tns:cacheControls" />
                <xsd:element ref="tns:date" />
                <xsd:element ref="tns:price" />
            </xsd:all>
        </xsd:complexType>
    </xsd:element>
    <xsd:element name="symbol" type="xsd:string" />
    <xsd:element name="quote">
        <xsd:complexType>
            <xsd:all>
                <xsd:element ref="tns:cacheControls" />
                <xsd:element ref="tns:symbol" />
                <xsd:element ref="tns:lastTrade" />
                <xsd:element ref="tns:change" />
                <xsd:element ref="tns:volume" />
            </xsd:all>
        </xsd:complexType>
    </xsd:element>
    <xsd:element name="quotes">
        <xsd:complexType>
            </xsd:sequence>
                <xsd:element ref="tns:quote" minOccurs="0" maxOccurs="unbounded"/>
            </xsd:sequence>
        <xsd:complexType>
    </xsd:element>
</xsd:schema>
```

FIG. 4

CACHING CONTROLS/POLICIES FOR STRUCTURED MARKUP OBJECTS

BACKGROUND OF THE INVENTION

1. Field of the Invention

The present invention relates generally to a computer-based memory system, and, more particularly, to defining objects and cache controls using XML-schema.

2. Description of the Related Art

Performance-oriented and disconnected applications are typically executed on caching-based computer systems. Caching occurs any time content or resources are retrieved, assembled or created, and then stored for later use. Caching often delivers increases in overall performance. Furthermore, it reduces the dependency on resource availability (e.g., the network, the cached resource).

An issue computer architects and developers struggle with is maintaining data freshness. The data being cached generally has a limited, useful life span. That is, at some point, the data in the cache may no longer accurately reflect the data at the source. At this point, the invalid data (i.e., the data in the cache) can either be purged, or it can be refreshed.

There are a number of known approaches to purging or refreshing the invalid data. First, an application may systematically refresh the invalid data given a satisfied condition (e.g., time, access). Second, a more advanced solution may provide a messaging-based solution where caches listen and post changes to a common message bus. A source may submit data changes to the message bus, or the caches can potentially provide refresh and publish functionality. Third, databases may have a timestamp field to enable querying of recently changed objects. This type of query often helps with synchronization, and is often referred to as polling. With polling, the source data is checked periodically to see if it has changed, and the source data is pulled only if it has changed. Fourth, the Hypertext Transfer Protocol ("HTTP") specification may attempt to address the issue of purging or refreshing the invalid data using special meta tags called cache control headers, as specified by the HTTP protocol specification. The cache control headers are directed to browsers and proxy servers to specify how long to cache the resource and when to check for a new resource.

Each of the above approaches share the same problem—the caching policy (i.e., the rules for purging or refreshing the invalid data) is either hard-coded into the application or part of a separate file accessed by the application, and is not part of the data itself.

For example, consider an implementation of the caching policy using HTTP/HTML (Hypertext Transfer Protocol/Hypertext MarkUp Language). As used herein, a "cache directive" refers to part of the HTTP protocol that determines how data is to be treated if cached. Cache directives are implemented as meta tags in HTTP/HTML. According to HTTP/HTML, the meta tags apply to the entire webpage containing the meta tags, and are specific to applications capable of accessing the webpage (e.g., a web browser). Meta tags cannot be interpreted by an application not using HTTP/HTML. Further, most applications not using HTTP/HTML do not store cache directives relative to the data represented by the directives.

SUMMARY OF THE INVENTION

In one aspect of the present invention, a method for defining cache controls as structured markup is provided. The method includes creating cache control attributes; and representing the cache control attributes using structured markup.

In another aspect of the present invention, a program storage device readable by machine, tangibly embodying a program of instructions executable by the machine to perform a method for defining cache controls as structured markup is provided. The method includes creating cache control attributes; and representing the cache control attributes using structured markup.

In yet another aspect of the present invention, a system for defining cache controls as structured markup is provided. The system includes means for creating cache control attributes; and means for representing the cache control attributes using structured markup.

BRIEF DESCRIPTION OF THE DRAWINGS

The invention may be understood by reference to the following description taken in conjunction with the accompanying drawings, in which like reference numerals identify like elements, and in which:

FIG. 1 depicts an exemplary definition of a stock quote object using cache controls, in accordance with one exemplary embodiment of the present invention;

FIG. 3 depicts a first alternate definition of the stock quote object of FIG. 1, in accordance with one exemplary embodiment of the present invention;

FIG. 4 depicts a second alternate definition of the stock quote object of FIG. 1, in accordance with one exemplary embodiment of the present invention.

DETAILED DESCRIPTION OF PREFERRED EMBODIMENTS

Figure 2:
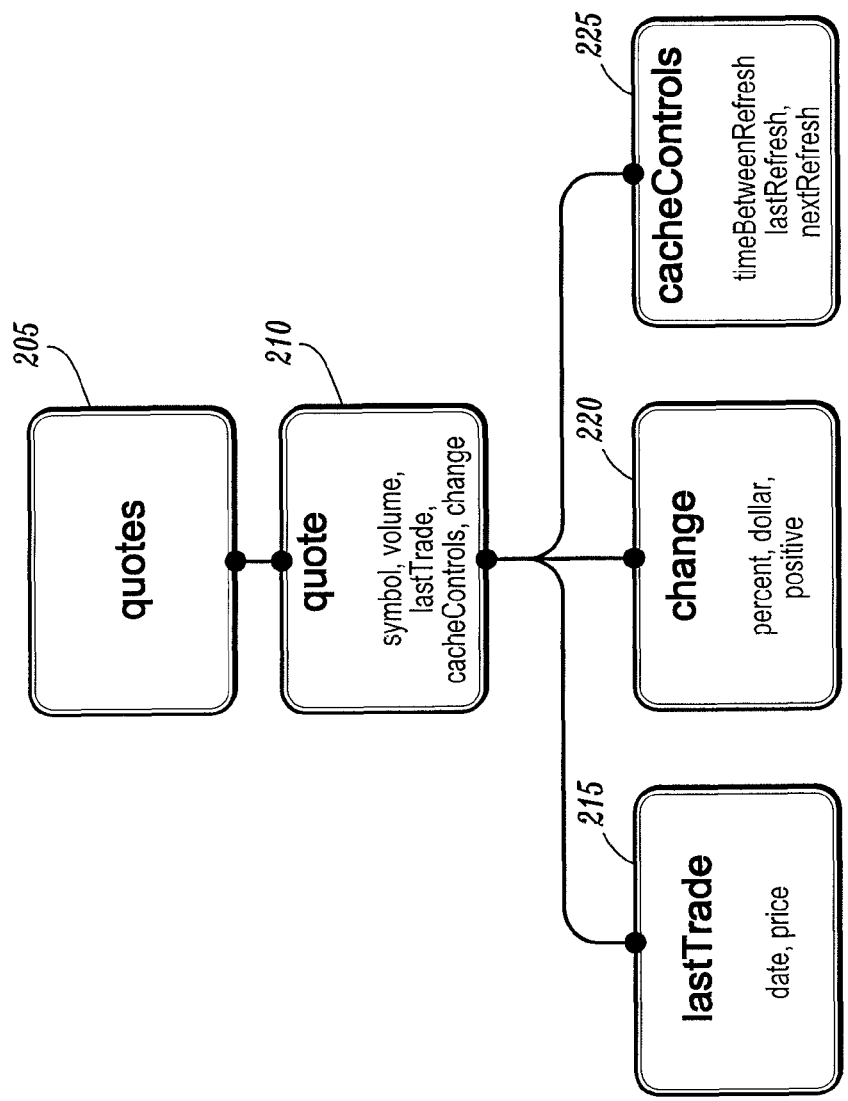
FIG. 2 depicts a class diagram of the stock quote object of FIG. 1, in accordance with one exemplary embodiment of the present invention.

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

We provide exemplary systems and methods using structured markup to define objects with cache controls. Examples of structure markup include Extensible Markup Language ("XML") and Standard Generalized Markup Language ("SGML"). Although XML is used hereafter for the sake of simplicity, it should be appreciated that other markup languages may be used as contemplated by those skilled in the art.

As used herein, "cache controls" refer generally to instructions for treating data that is cached. Cache controls may be specified using XML-schema, which may represent a structure of attributes for the cache controls (e.g., when to refresh, how many accesses before a next refresh) and default values (e.g., refresh every ten seconds, refresh after every 1,000 accesses). As used herein, the term "cache control structure" refers to the structure of attributes for the cache controls implemented A cache control structure (i.e., the XML-schema) can be added to a variety of levels (i.e., layers) of granularity in the object. For example, levels may be formed in an object-oriented language using inheritance. This ability to apply the cache control structure to any of a variety of levels of an object is unique over the prior art.

XML data binding, which is the process of converting XML-schema to native object code, may provide an application access to the cache controls of an object. For example, a caching application may reference the XML-schema as part of the cache refresh strategy of the caching application. The XML-schema may be accessed using a Uniform Resource Locator ("URL"), for example, for convenient remote access. It should be appreciated that objects may be accessed locally or remotely, as contemplated by those skilled in the art.

Native object code may be formed using any of a variety of object-oriented programming languages (e.g., JAVA) as contemplated by those skilled in the art. Any default values may also be defined in the cache control structure itself, contained in a file to be accessed by the application, or hard-coded in the application itself.

It should be appreciated that any of a variety of systems and methods (e.g., Castor) may be used for XML schema to native object translation, as contemplated by those skilled in the art. It should further be appreciated that any of a systems and methods (e.g., Castor, JAXB) may be used to define objects using structured markup, as contemplated by those skilled in the art.

Referring now to FIG. 1, an exemplary definition of a stock quote object using cache controls is shown, in accordance with one exemplary embodiment of the present invention. The definition is implemented in XML. Portions of the code in FIG. 1 will now be described in more detail.

```
<xsd:element name="volume" type="xsd:integer"/>
<xsd:element name="dollar" type="xsd:float"/>
<xsd:element name="percent" type="xsd.float"/>
<xsd:element name="positive" type="xsd:boolean"/>
<xsd:element name="timeBetweenRefresh" type="xsd:long"/>
<xsd:element name="lastRefresh" type="xsd:long"/>
<xsd:element name="nextRefresh" type="xsd:long"/>
```

The above portion defines the elements "volume," "dollar," "percent," "positive," "timeBetweenRefresh," "lastRefresh" and "nextRefresh." Each element is assigned a data type in accordance with XML schema language specifications.

```
<xsd:element name="cacheControls">
    <xsd:complexType>
        <xsd:all>
            <xsd:element ref="tns:timeBetweenRefresh" />
```

-continued

```
            <xsd:element ref="tns:lastRefresh" />
            <xsd:element ref="tns:nextRefresh" />
        </xsd:all>
    </xsd:complexType>
</xsd:element>
```

The above portion defines a complex type called "cacheControls" in accordance with XML schema language specifications. The element cacheControls is defined to include the elements timeBetweenRefresh, lastRefresh, and nextRefresh.

In one exemplary embodiment of the present invention, the element timebetweenRefresh refers to the amount of time needed between refreshing data, the element lastRefresh refers to the last time data was refreshed, and the element nextRefresh refers to the next time data is to be refreshed. Alternate embodiments may use any of a variety of cache refresh elements, as contemplated by those skilled in the art.

```
<xsd:element name="change">
    <xsd:complexType>
        <xsd:all>
            <xsd:element ref="tns:percent" />
            <xsd:element ref="tns:dollar" />
            <xsd:element ref="tns:positive" />
        </xsd:all>
    </xsd:complexType>
</xsd:element>
```

The above portion defines a complex type called "change" in accordance with XML schema language specifications. The element change is defined to include the elements percent, dollar, and positive.

```
<xsd:element name="price" type="xsd:float"/>
<xsd:element name="date" type="xsd:long"/>
```

The above portion defines the elements "price" and "data." Each element is assigned a data type in accordance with XML schema language specifications.

```
<xsd:element name="lastTrade">
    <xsd:complexType>
        <xsd:all>
            <xsd:element ref="tns:date" />
            <xsd:element ref="tns:price" />
        </xsd:all>
    </xsd:complexType>
</xsd:element>
```

The above portion defines a complex type called "lastTrade" in accordance with XML schema language specifications. The element lastTrade is defined to include the elements date and price.

```
<xsd:element name="symbol" type="xsd:string"/>
```

The above portion defines the element "symbol," which is assigned the data type string in accordance with XML schema language specifications.

```
<xsd:element name="quote">
    <xsd:complexType>
        <xsd:all>
            <xsd:element ref="tns:cacheControls" />
            <xsd:element ref="tns:symbol" />
```

```
            <xsd:element ref="tns:lastTrade" />
            <xsd:element ref="tns:change" />
            <xsd:element ref="tns:volume" />
        </xsd:all>
    </xsd:complexType>
</xsd:element>
```

The above portion defines a complex type called "quote" in accordance with XML schema language specifications. The element quote is defined to include the elements symbol, lastTrade, change and volume. The element quote also includes the previously defined complex type cacheControls.

It should be appreciated that the above XML code effectively applies the element cacheControls to the elements of symbol, lastTrade, change and volume. Thus, the elements of symbol, lastTrade, change and volume can be refreshed in accordance with a particular caching application or a particular user.

It should be noted that the above XML code does not provide default values for cacheControls. In alternate embodiments, default values for cacheControls may be provided within the code itself, an application using the code, or an external file accessed by the application.

```
<xsd:element name="quotes">
    <xsd:complexType>
        <xsd:sequence>
            <xsd:element ref="tns:quote" minOccurs="0" maxOccurs="unbounded"/>
        </xsd:sequence>
    </xsd:complexType>
</xsd:element>
```

The above portion defines a complex type called "quotes" in accordance with XML schema language specifications. The element quotes is defined as an unbounded sequence of the element quote defined previously. For example, the element quotes may produce a sequence of stock symbols.

Referring now to FIG. 2, a class diagram of FIG. 1 is shown, in accordance with one exemplary embodiment of the present invention. The class diagram is a pictorial representation of the complex types described in FIG. 1. The organization of the class diagram of FIG. 2 is in reverse order of the organization of the XML code of FIG. 1. Thus, quotes 205 is at the top of the class diagram. Because the element quotes is defined using the complex element quote in FIG. 1, quote 210 branches from quotes 205 in the class diagram of FIG. 2. Because the element quote is defined using the complex elements lastTrade, change and cacheControls in FIG. 1, lastTrade 215, change 220 and cacheControls 225 branch from quote 210 in the class diagram of FIG. 2.

Using the class diagram of FIG. 2, one can easily see that cacheControls 225 applies to the simple elements of symbol, volume, date, price, percent, dollar and positive. Thus, the elements of symbol, volume, date, price, percent, dollar and positive can be controlled by an application utilizing the XML code in FIG. 1.

Referring now to FIG. 3, a first alternate definition of the stock quote object of FIG. 1 using cache controls is shown, in accordance with one exemplary embodiment of the present invention. The XML code in FIG. 3 is substantially similar to the XML code of FIG. 1. Differences include the following:
`<xsd:element name="timeBetweenRefresh" type "xsd:long" default="60"/>`

As shown in the code portion above from FIG. 3, the element timeBetweenRefresh is given a default value of "60." For example, the designer of the code may desire that the cache data be refreshed every 60 seconds. Although only timeBetweenRefresh is shown to have a default value in the above embodiment, alternate embodiments may include default values for any number of elements in the object-oriented code. Further, it should be appreciated that the default values may be overridden, for example, by an application program utilizing the XML code.

Referring now to FIG. 4, a second alternate definition of the stock quote object of FIG. 1 using cache controls is shown, in accordance with one exemplary embodiment of the present invention. The XML code in FIG. 4 is substantially similar to the XML code of FIG. 1. Differences include the following:

```
<xsd:element name="lastTrade">
    <xsd:complexType>
        <xsd:all>
            <xsd:element ref="tns:cacheControls" />
            <xsd:element ref="tns:date" />
            <xsd:element ref="tns:price" />
        </xsd:all>
    </xsd:complexType>
</xsd:element>
```

As shown by the above code portion of FIG. 4, the element cacheControls has been added into the element lastTrade. Thus, if lastTrade is used by an application, the application can refresh the elements of date and price using cacheControls.

Figure 5:
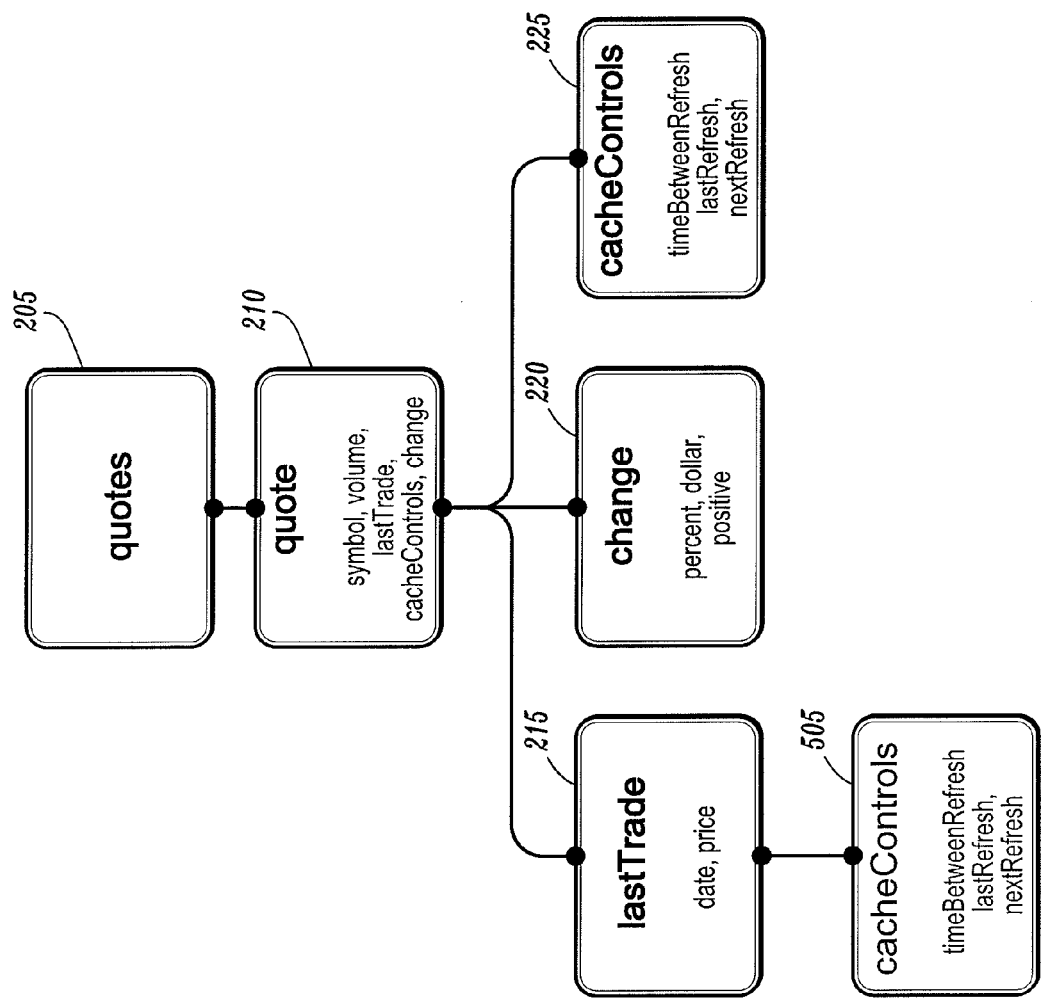
FIG. 5 depicts a class diagram of the stock quote object of FIG. 4, in accordance with one exemplary embodiment of the present invention.

Referring now to FIG. 5, a class diagram of FIG. 4 is shown, in accordance with one exemplary embodiment of the present invention. The class diagram shows that cacheControls 505 has been applied to lastTrade 215.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method executed by a caching-based computer system for defining an object with cache controls using structured markup for controlling a computer-based memory system, comprising:

specifying cache control attributes;

defining an application including a cache control structure in structured markup, the cache control structure comprising the cache control attributes;

defining the object in the structured markup, wherein the object inherits the cache control structure of the application, and wherein the cache control structure is applied to the object for controlling data to be cached by the object; and executing the application by the caching-based computer system wherein data of the object is refreshed in a cache of the computer-based memory system according to the cache controls, wherein specifying cache control attributes comprises using structured markup to define an element for each of (a) a time between refresh, (b) a last refresh, and (c) a next refresh, and wherein each of the elements (a) through (c) is provided with a default value.

2. The method of claim 1, wherein defining the cache control structure using structured markup comprises representing the cache control structure using Extensible Markup Language (XML).

3. The method of claim 1, wherein defining the cache control structure using structured markup comprises representing the cache control structure using Standard Generalized Markup Language (SGML).

4. The method of claim 1, wherein applying the cache control structure to one or more layers of granularity in the object comprises executing CASTOR to add the cache control structure to one or more levels in the object.

5. The method of claim 1, wherein applying the cache control structure to one or more layers of granularity in the object comprises executing JAXB to add the cache control structure to one or more levels in the object.

6. The method of claim 1, wherein applying the cache control structure to one or more layers of granularity in the object comprises translating the structured markup into an object-oriented language.

7. The method of claim 6, wherein translating the structured markup into an object-oriented language comprises translating the structured markup using CASTOR.

8. The method of claim 6, wherein translating the structured markup into an object-oriented language comprises translating the structured markup into JAVA.

9. The method of claim 6, wherein translating the structured markup into an object-oriented language comprises translating the structured markup using XML data binding.

10. The method of claim 1, wherein the application accesses the object with cache controls locally.

11. The method of claim 1, wherein the application accesses the object with cache controls remotely.

12. The method of claim 11, wherein the application accesses the object with cache controls using a uniform resource locator (URL).

13. The method of claim 1, further comprising defining a second object of the application in the structured markup that inherits the cache control structure from the object, wherein the cache control structure is applied to the second object of the application.

14. The method of claim 1, wherein one or more elements of the object selectively inherit the cache control structure of the application.

15. A program storage device readable by machine, tangibly embodying a program of instructions executable by the machine to perform a method for defining an object with cache controls using structured markup, the method comprising:

specifying cache control attributes;

defining an application including a cache control structure in structured markup, the cache control structure comprising the cache control attributes;

defining the object in the structured markup, wherein one or more elements of the object selectively inherit the cache control structure of the application, and wherein the cache control structure is applied to the object for controlling data to be cached by the object; and executing the application wherein data of the object is refreshed according to the cache controls, wherein specifying cache control attributes comprises using structured markup to define an element for each of (a) a time between refresh, (b) a last refresh, and (c) a next refresh, and wherein each of the elements (a) through (c) is provided with a default value.

* * * * *